United States Patent [19]

Novotny

[11] Patent Number: 5,516,131
[45] Date of Patent: May 14, 1996

[54] QUICK-RELEASE SKEWER WITH TRAILER ATTACHMENT POINTS

[75] Inventor: Philip J. Novotny, San Luis Obispo, Calif.

[73] Assignee: B.O.B. Trailers, Inc., San Luis Obispo, Calif.

[21] Appl. No.: 303,478

[22] Filed: Sep. 9, 1994

[51] Int. Cl.$^6$ .............................. B62D 53/00; B62K 27/12
[52] U.S. Cl. .......................................................... 280/204
[58] Field of Search .................................... 280/202, 204

[56] References Cited

U.S. PATENT DOCUMENTS

| | | | |
|---|---|---|---|
| 3,347,559 | 10/1967 | Robinson | 280/204 |
| 4,511,155 | 4/1985 | Galloway | 280/204 |
| 4,725,067 | 2/1988 | Lunoy | 280/204 |

FOREIGN PATENT DOCUMENTS 221784   9/1942   Switzerland ............................ 280/204

Primary Examiner—Mitchell J. Hill
Attorney, Agent, or Firm—Daniel C. McKown

[57] ABSTRACT

A quick-release skewer that secures the frame of a bicycle to the hub of the rear wheel in the usual manner and that includes provision for pivotally attaching the frame of a trailer to the rear axle of the bicycle. Both the nut and the cam housing of the quick-release skewer include integral posts that extend axially outward from the center of the rear wheel of the bicycle. A sleeve is mounted for rotation on each of the posts, and a trailer fork member is retained on each of the sleeves. In a preferred embodiment the sleeves are bobbin-shaped and low-friction bushings are interposed between the sleeves and the posts.

5 Claims, 3 Drawing Sheets

QUICK-RELEASE SKEWER WITH TRAILER ATTACHMENT POINTS

BACKGROUND OF THE INVENTION

1. Field of the Invention

The present invention is in the field of bicycles and more specifically relates to a quick-release device that simultaneously secures the rear axle of the bicycle to the frame of the bicycle and provides means for securing a trailer to the rear axle of the bicycle.

2. The Prior Art

In U.S. Pat. No. 559,761 issued May 5, 1896, Trancle-Armand shows the use of left and right brackets to secure a trailer to a bicycle. Each bracket includes a longitudinally-oriented tube affixed to a laterally-oriented tube. The laterally-oriented tubes are fitted onto extensions of the rear axle of the bicycle. The trailer is then connected to the bicycle by means of a fork having two forwardly-extending tines that extend through the longitudinally-oriented tubes and that are prevented from withdrawing by nuts that engage threads at the ends of the tines. If the brakes are applied suddenly, the tines of the fork can surge forward in the longitudinally-oriented tubes.

In U.S. Pat. No. 2,254,797, issued Sep. 2, 1941, Dubay shows the use of a fork having forwardly-extending tubular tines for attaching a trailer to a bicycle. Holes adjacent the ends of the tines on their opposing surfaces receive the ends of the rear axle. The tines are drawn together by a spring which, if it is strong enough, will prevent the tines from becoming disengaged from the ends of the axle.

In U.S. Pat. No. 5,171,034 issued Dec. 15, 1992, Scott shows the use of a special nut that is screwed onto the threaded ends of the rear axle of a bicycle and that includes an outwardly extending cylindrical post on which the tines are held captive by a pin that extends perpendicular to the axis of the axle.

None of the above patents shows a way of attaching a fork for a trailer to the rear axle of a bicycle when the rear axle is secured to the frame of the bicycle by a modern quick-release device, also called a quick-release skewer.

Therefore the present inventor undertook the task of devising a trailer attachment that would retain the advantages of the now widely used quick-release skewer.

SUMMARY OF THE INVENTION

It is an objective of the present invention to provide an apparatus that retains the advantage of the quick-release skewer for securing the rear axle to the frame of a bicycle while at the same time providing a way of securing the front ends of a trailer attachment fork to the rear axle of the bicycle.

In accordance with a preferred embodiment of the invention, an outwardly-directed cylindrical post is added to both the adjustment nut and to the cam housing of a conventional quick-release skewer. Bobbin-shaped sleeves are provided which ride on the cylindrical extensions and which include an outer circumferential groove for receiving the downwardly directed grooves at the ends of the tines of the trailer-attachment fork. The bobbin-shaped sleeves are secured to the cylindrical extensions by washers on screws that extend axially into the ends of the posts.

The novel features which are believed to be characteristic of the invention, both as to its structure and its method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
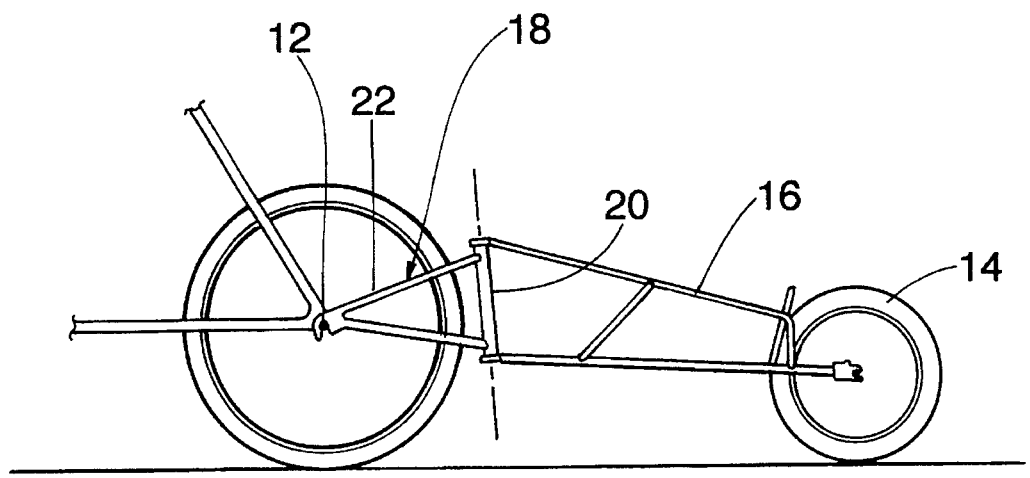
FIG. 1 is a fractional side elevational view of a bicycle and trailer of a type used in connection with the present invention.
Figure 4:
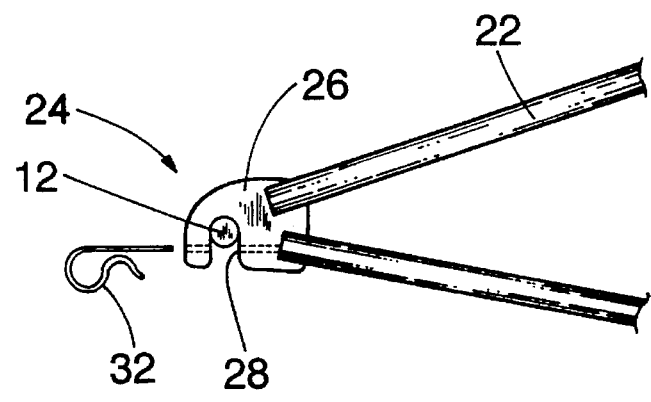
FIG. 4 is a fractional side elevational view showing the use of a pin in the present invention to secure a trailer hook to the quick-release skewer of the present invention; and, FIG. 5 is an exploded view showing the components of a preferred embodiment of the quick-release skewer of the present invention.

FIG. 1 shows a trailer of a type that is particularly well suited for use with the present invention, attached to the rear axle 12 of a bicycle. The trailer includes a single rear wheel 14, a frame 16, and a fork assembly 18 connected to the frame 16 by a hinge 20. The fork assembly includes two forwardly extending tines, of which only the left tine 22 is visible in FIG. 1. Each tine terminates in a hook of which the hook 24 of FIG. 4 is typical. The hook includes a heavy plate 26 having a downwardly opening slot 28. An axle 12 may be secured in the slot 28 by inserting a pin 32 (sometimes called a hairpin cotter) into a bore extending into the end of the plate 26, thereby capturing the axle on its tangent.

If the rear axle 12 of the bicycle were long enough, one could simply use a nut to prevent the hook 24 of the trailer from slipping off the end of the rear axle 12.

Figure 2:
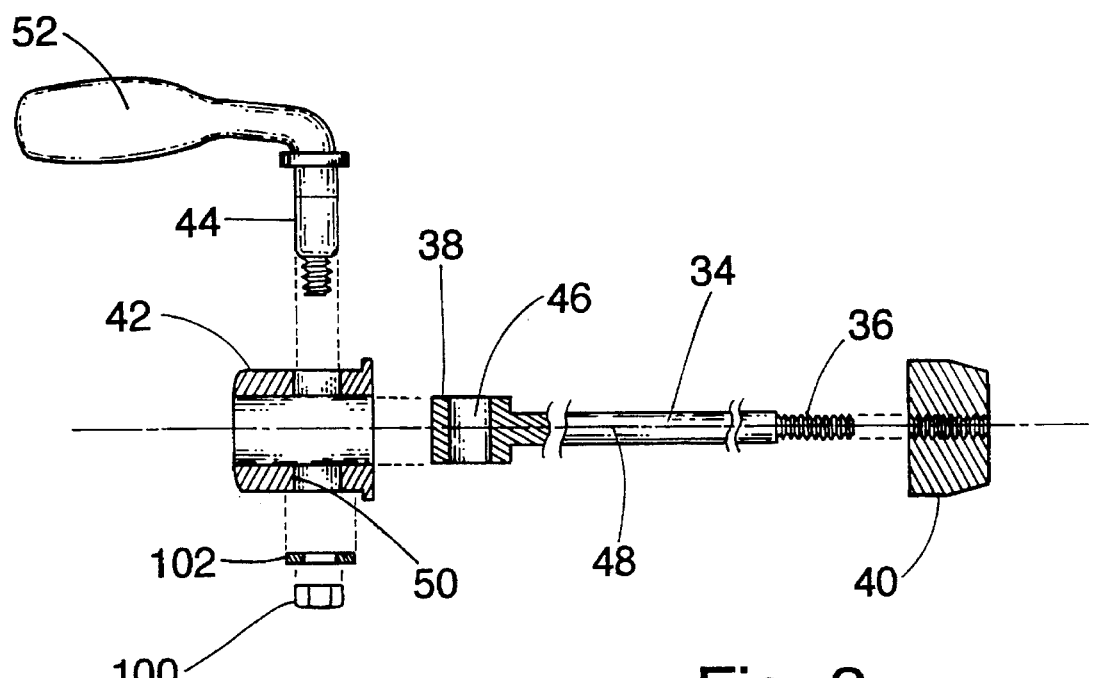
FIG. 2 is a side elevational view partly in cross section of a quick-release skewer of a type known in the prior art.

The problem solved by the present invention arises when a conventional quick-release skewer like that shown in FIG. 2 is used for securing the rear axle 12 of the bicycle to the frame of the bicycle.

As best seen in FIG. 2, the conventional quick-release skewer includes a shaft 34 having a threaded portion 36 at one end and an enlarged head portion 38 at the opposite end. The shaft 34 is inserted through the hub of the rear wheel of the bicycle, and the nut 40 is then screwed onto the threaded portion 36 both to secure the skewer to the hub and to adjust the effective length of the shaft 34. The head portion 38 includes a hole 46 that extends perpendicular to the axis 48 and that registers with a hole 50 through the cam housing 42. In use, the cam 44 secures the cam housing 42 to the head portion 38. Manual rotation of the handle 52 brings to bear powerful compressive forces between the nut 40 and the cam housing 42 which compress the rear wheel hub against the drop-outs of the bicycle frame.

As can be seen from FIG. 2, the conventional quick-release skewer provides no attachment point for connecting a trailer.

If the hook of the trailer fork assembly were simply placed along side the drop-out of the bicycle frame on the shaft 34, it can be appreciated that the compressive force applied by the quick-release skewer would prevent or impede the hook of the trailer from pivoting about the rear axle of the bicycle.

The speed and convenience of the conventional quick-release skewer of FIG. 2 has made its use very common on bicycles, but its lack of a provision for attaching a trailer is a serious limitation. The present invention is addressed to overcoming this limitation.

Figure 3:
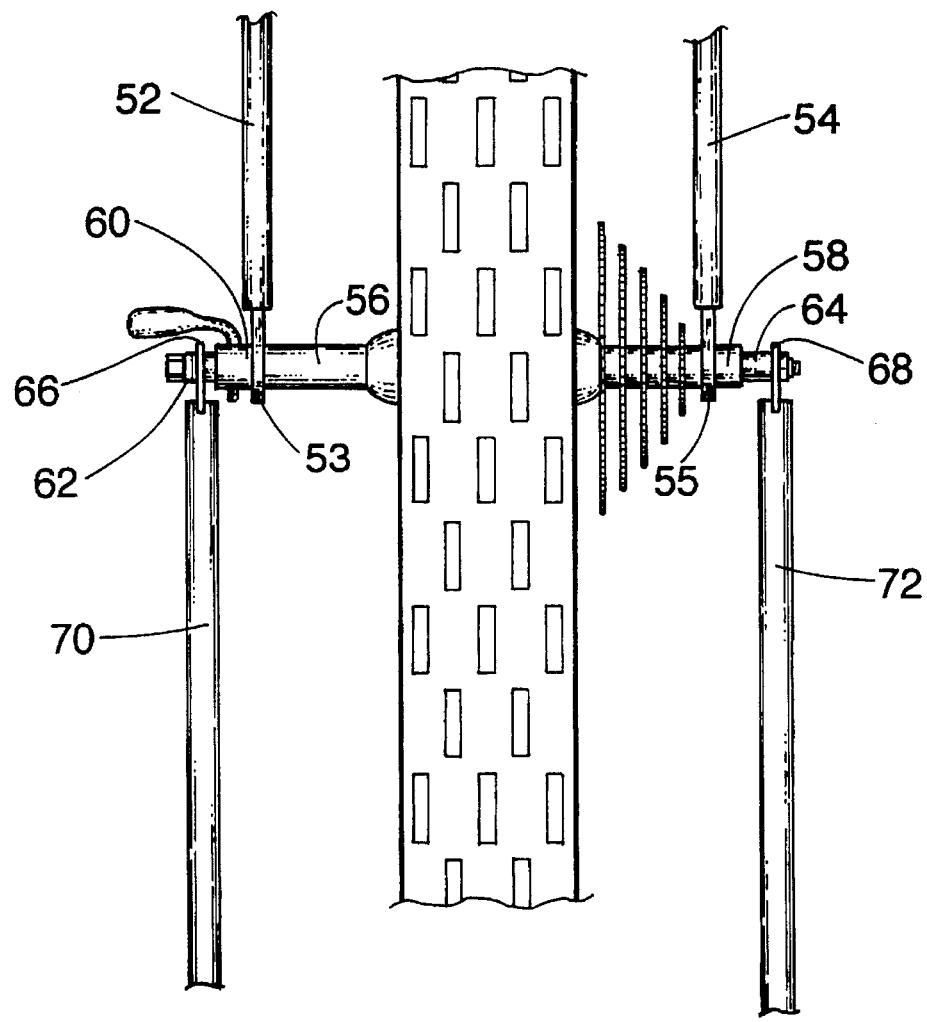
FIG. 3 is a fractional top plan view showing the quick-release skewer of the present invention installed in the rear wheel of a bicycle pulling a trailer.
Figure 5:
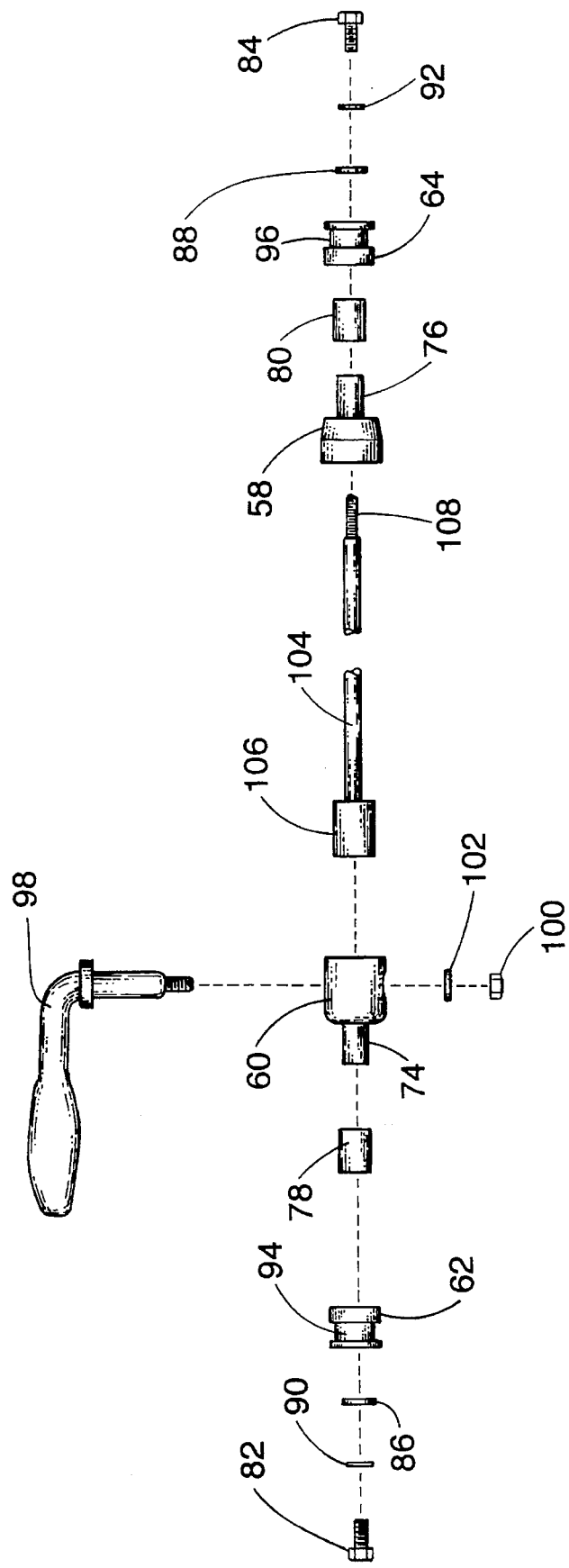

FIG. 3 is a top plan view showing the quick-release skewer of the present invention in use on the rear hub of a bicycle. FIG. 5 is an exploded view showing the components of the quick-release skewer of the present invention in a preferred embodiment.

As best seen in FIG. 3, bicycle frame members 52 and 54 (commonly called seat stays) terminate in drop-outs 53 and 55 which are similar to the trailer hook shown in FIG. 4, which rest on the hub axle of the bicycle wheel, and which are compressed against the hub 56 between the nut 58 and the cam housing 60. The quick-release skewer of the present invention thus is used in exactly the same way that a conventional quick-release skewer is used in securing the hub 56 to the bicycle frame drop-outs 53 and 55.

The significant difference between the quick-release skewer of the present invention and conventional quick-release skewers is the utilization in the present invention first and second sleeves 62 and 64, respectively, which are mounted for rotation on axial extensions of the cam housing 60 and adjustment nut 58. In a preferred embodiment, each of the sleeves 62 and 64 includes a circumferential groove in which hooks 66 and 68 of the tines 70 and 72 of the trailer fork assembly ride.

As best seen in FIG. 5, cylindrical posts 74 and 76 are an integral part of the cam housing 60 and the nut 58 respectively and extend outwardly along the axis. Low-friction bushings 78 and 80 respectively are press-fitted into the sleeves 62 and 64 respectively and the bushings 78 and 80 rotate on the posts 74 and 76 respectively.

The posts 74 and 76 are tapped to receive the screws 82 and 84, and the sleeves 62 and 64 are retained on the posts 74 and 76 by the washers 86 and 88 and the lock washers 90 and 92. The length of the posts 74 and 76 in the axial direction is slightly greater than the axial length of the sleeves 62 and 64 and the bushings 78 and 80 to insure that the sleeves will rotate freely when the screws 82 and 84 are tightened.

The circumferential grooves 94 and 96 in the sleeves 62 and 64 are not located axially at the center of each sleeves, and this is intentional. By altering the direction in which the sleeves are placed on the posts, the spacing between the circumferential grooves 94 and 96 can be altered to accommodate variations in the spacing between the rear wheel drop-outs 53 and 55 of the bicycle frame. The cam 98 is secured to the cam housing 60 by means of the nut 100 and lock washer 102.

The bobbin-shaped sleeves 62 and 64 used in the preferred embodiment are a specialized type of sleeve that is characterized by the circumferential grooves 94 and 96. In an alternative embodiment of the invention, the sleeves 62 and 64 are replaced by simple cylindrical sleeves. Also, in other embodiments, the bushings 78 and 80 are omitted.

In operation, initially the head 106 has already been secured within the cam housing 60 by means of the cam 98, the lock washer 102, and the nut 100. The threaded end 108 of the shaft 104 is inserted through the hub 56 of the rear wheel of the bicycle, and the drop-outs 53 and 55 of the bicycle frame members 52 and 54 are positioned on the wheel hub axle. Thereafter, the nut 58 is attached to the threaded portion 108 of the shaft 104, and then the cam 98 is turned to bind the hub 56 to the bicycle frame drop-outs 53 and 55. Finally, the hooks 66 and 68 of the tines 70 and 72 are brought down upon the sleeves 62 and 64 where the hooks are secured by inserting a pin similar to the pin 32 of FIG. 4. Thus, connecting the trailer to the bicycle involves only bringing the hooks 66 and 68 down into the grooves 94 and 96 of the sleeves 62 and 64, and inserting two pins. Similarly, the trailer may be detached from the bicycle simply by pulling the pins and lifting the tines. In this way, the present invention preserves the normal quick-release advantage as applied to the rear wheel of the bicycle while at the same time the present invention provides a very rapid and convenient way of attaching and detaching the trailer to the bicycle.

Although the majority of trailers will have hooks similar to that shown in FIG. 4 for attaching the trailer to a bicycle, the usefulness of the present invention is not limited to trailers having such hooks. For example, if the plate 26 of FIG. 4 included a circular hole or an inverted keyhole in place of the slot 28, the sleeved embodiment of the present invention could still be used if the washers 86 and 88 were larger than shown in FIG. 5. The present invention could also be used if the trailer fork member were attached by means of a spring-loaded carabiner.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. In a quick-release skewer of a type including a shaft having an axis, having a threaded portion at a first end of the shaft, and having an enlarged head at a second end of the shaft, including a nut engaging the threaded portion, the head having portions defining a hole extending completely through the head in a direction perpendicular to the axis of the shaft, including a cam housing fitting closely around the head and having portions defining a hole that registers with the hole through the head, including a cam having a shaft extending through the hole in the cam housing and the hole in the head, the shaft of the cam having an eccentric portion for producing a limited motion of the cam housing along the shaft when the cam is rotated, the improvement comprising in combination:

a first post, integral with the nut and extending outward from the nut coaxially with the shaft;

a first sleeve riding on said first post;

a second post, integral with the cam housing and extending outward from the cam housing coaxially with the shaft; and, a second sleeve riding on said second post, whereby said first sleeve and said second sleeve provide attachment surfaces that are pivotable about the axis of the shaft.

2. The improvement of claim 1 further comprising in combination: means for retaining said first sleeve on said first post and said second sleeve on said second post.

3. The improvement of claim 2 wherein said means includes a washer on a first screw that engages said first post, and a washer on a second screw that engages said second post.

4. The improvement of claim 1 further comprising in combination: a first bushing composed of a low-friction material and located between said first sleeve and said first post, and a second bushing composed of a low-friction material and located between said second sleeve and said second post.

5. The improvement of claim 1 wherein said first sleeve and said second sleeve each further include a circumferential groove.

* * * * *